(12) United States Patent
Sanin Riano et al.

(10) Patent No.: US 11,686,590 B2
(45) Date of Patent: Jun. 27, 2023

(54) CORRECTING SPEED ESTIMATIONS USING AGGREGATED TELEMETRY DATA

(71) Applicant: Mapbox, Inc., San Francisco, CA (US)

(72) Inventors: Camilo Sanin Riano, Oakland, CA (US); Ruggero Altair Tacchi, San Francisco, CA (US); David Ariel Gold, Columbia, CA (US)

(73) Assignee: Mapbox, Inc., Washington, DC (US)

( * ) Notice: Subject to any disclaimer, the term of this patent is extended or adjusted under 35 U.S.C. 154(b) by 569 days.

(21) Appl. No.: 16/718,090

(22) Filed: Dec. 17, 2019

(65) Prior Publication Data

US 2021/0180972 A1    Jun. 17, 2021

(51) Int. Cl.
| | | |
|---|---|---|
| G01C 21/34 | (2006.01) | |
| G01C 21/36 | (2006.01) | |
| G06N 20/00 | (2019.01) | |
| G01C 21/32 | (2006.01) | |
| G06F 16/29 | (2019.01) | |
| G01C 21/16 | (2006.01) | |

(52) U.S. Cl.
CPC ......... *G01C 21/3492* (2013.01); *G01C 21/16* (2013.01); *G01C 21/32* (2013.01); *G01C 21/3694* (2013.01); *G06F 16/29* (2019.01); *G06N 20/00* (2019.01)

(58) Field of Classification Search
CPC .... G01C 21/3492; G01C 21/16; G01C 21/32; G01C 21/3694; G06F 16/29; G06N 20/00
See application file for complete search history.

(56) References Cited

U.S. PATENT DOCUMENTS

| | | | |
|---|---|---|---|
| 10,060,751 B1* | 8/2018 | Chen | G06N 7/01 |
| 10,830,596 B2* | 11/2020 | Mieth | G08G 1/096816 |
| 2019/0050624 A1* | 2/2019 | Chai | G06N 20/00 |
| 2019/0063939 A1 | 2/2019 | Chai et al. | |
| 2020/0151611 A1* | 5/2020 | McGavran | G07C 5/008 |

\* cited by examiner

*Primary Examiner* — Ig T An
(74) *Attorney, Agent, or Firm* — Fenwick & West LLP (57) ABSTRACT

A method for correcting speed estimates for route planning using a machine-learned speed correction model trained on aggregated road data. Location and movement data collected from a plurality of mobile computing devices is aggregated on a server computer and used to train a speed correction model to correct estimated speeds corresponding to roads in one or more geographic regions. Speeds estimates for a road segment in a geographic region are corrected using a speed correction model trained on road data describing road segments in the same geographic region. In some embodiments, road data corresponding to one or more geographic regions is assigned to groups in training the speed correction model. The road data may be anonymized or segmented such that an originating device or route is unidentifiable. More fine-grained speed correction models may also be trained for different or additional factors than geographic region, such as day and/or time.

18 Claims, 7 Drawing Sheets

CORRECTING SPEED ESTIMATIONS USING AGGREGATED TELEMETRY DATA

FIELD OF ART

The description relates to improved methods, computer software and/or computer hardware in the field of electronic maps. The disclosure relates more specifically to improved methods for correcting estimated speeds using aggregated telemetry data.

BACKGROUND

Digital electronic maps are widely used today for navigation, ride sharing, and video games, among other uses. While stand-alone map applications often include many of these functionalities, other applications can make use of electronic maps by calling a map server through an Application Programming Interface (API) on computing devices.

When a mobile device is using an electronic map, the location of the mobile device can be determined using WiFi or the Global Positioning System (GPS), which reports a device location using latitude and longitude, and optionally height and time as well. This location data, as well as other data, may be collected by the electronic map provider and may be termed "telemetry" data for the mobile device. Other information, such as speed, heading, acceleration, and deceleration may be calculated using the telemetry data. In particular, speed may be used to estimate the average or expected speed of travel on a road. The average or expected speed of travel may then be used, along with other information, to accurately estimate arrival time at a destination. However, the large amounts of telemetry data that are received can make accurate speed estimation challenging, and contextual factors may lead to speed estimates derived from telemetry being inaccurate. Thus, improved methods of accurately estimating travel speeds are needed.

SUMMARY

A method for correcting speed estimations using a speed correction model trained on aggregated telemetry data received from client devices is disclosed herein. In the embodiments discussed below the technique is implemented on a server computer which receives telemetry data from several mobile computing devices (e.g. a smart phone), although the method can be implemented on any client-side or server-side computing device, or on a combination thereof. The received telemetry data may include observed device speeds associated with a road or segments of a road, or the telemetry data may be processed to determine device speeds on the road or segments of the road. Additionally, the aggregated telemetry data may be anonymized or segmented such that it does not include information specific to an individual user or device (e.g. an originating mobile computing device or an overall route travelled by a device).

The server computer receives telemetry data corresponding to one or more roads in one or more geographic regions represented on an electronic map from mobile computing devices. Using the received telemetry data, a mapping application component of the server computer estimates a speed of a client device on each of the road segments. However, the speed estimates may have biases due to the estimation process using data corresponding to roads with characteristics different than the received data (e.g. more or less traffic, different time of day, different type of road, etc.). To correct for these biases in the estimated speeds, the mapping application uses a speed correction model to correct the estimated speeds for any errors in the estimations resulting from the estimation model. The corrected speeds are then provided to other components of the mapping application or the server to be used for additional processing. For example, the server computer may aggregate the corrected speeds to determine an estimated time of arrival for a user of a client device intending to follow a route on the electronic map.

In some embodiments, the speed correction model is trained using telemetry data from the same geographic region as the speed estimations it is used to correct. For example, the speed correction model may provide a speed correction mapping based on telemetry data in a specific geographic region. In this case, the speed correction mapping is associated with the geographic region and used to correct estimated speeds for roads in the same geographic region. In some embodiments, the telemetry data is processed and grouped before being used to train the speed correction model. In this case, the speed correction model may be associated with several geographic regions, where the speed correction model was trained using data from each of the associated geographic regions. As a result, the same speed correction model is used to correct speeds estimated for roads in each of the associated geographic regions.

In some embodiments, the speed correction model is trained using processed telemetry data that encodes the error between estimated road speeds and actual road speeds in one or more geographic regions. The encoded estimation errors may be used to build a similarity score for each geographic region, which is used to assign the geographic regions to groups. The speed correction model is then trained using the estimation errors corresponding to the geographic regions in a group.

DETAILED DESCRIPTION

I. System Environment & Architecture

Figure 1:
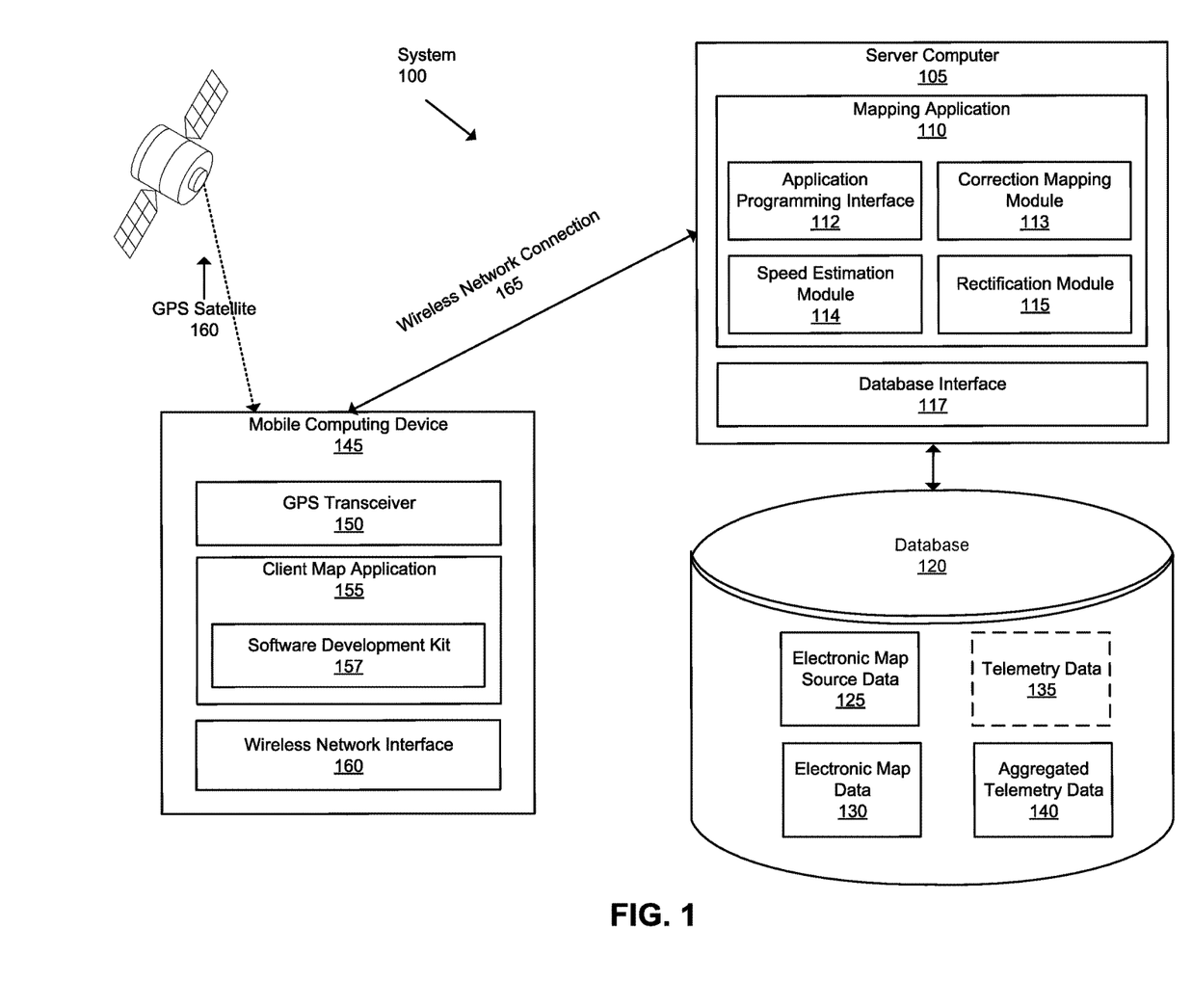
FIG. 1 illustrates an example computer system in which the techniques described may be practiced, according to one embodiment.

FIG. 1 illustrates an example computer system in which the techniques described may be practiced, according to one embodiment.

In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 illustrates a mobile computing device 145 that is coupled via a wireless network connection 165 to a server computer 105, which is coupled to a database 120. A GPS satellite 160 is coupled via a wireless connection to the mobile computing device 145. The server computer 105 comprises a mapping application 110, an application programming interface (API) 112, speed estimation module 114, correction mapping module 113, rectification module 115 and a database interface 117. The database 120 comprises electronic map source data 125, electronic map data 130, telemetry data 135, aggregated telemetry data 140, and trace data 142. The mobile computing device 145 comprises a GPS transceiver 150, client map application 155, software development kit (SDK) 157 and wireless network interface 160.

Server computer 105 may be any computing device, including but not limited to: servers, racks, work stations, personal computers, general purpose computers, laptops, Internet appliances, wireless devices, wired devices, multi-processor systems, mini-computers, and the like. Although FIG. 1 shows a single element, the server computer 105 broadly represents one or multiple server computers, such as a server cluster, and the server computer may be located in one or more physical locations. Server computer 105 also may represent one or more virtual computing instances that execute using one or more computers in a datacenter such as a virtual server farm.

Server computer 105 is communicatively connected to database 120 and mobile computing device 145 through any kind of computer network using any combination of wired and wireless communication, including, but not limited to: a Local Area Network (LAN), a Wide Area Network (WAN), one or more internetworks such as the public Internet, or a company network. Server computer 105 may host or execute mapping application 110, and may include other applications, software, and other executable instructions, such as database interface 117, to facilitate various aspects of embodiments described herein.

In one embodiment, database interface 117 is a programmatic interface such as JDBC or ODBC for communicating with database 120. Database interface 117 may communicate with any number of databases and any type of database, in any format. Database interface 117 may be a piece of custom software created by an entity associated with mapping application 110, or may be created by a third-party entity in part or in whole.

In one embodiment, database 120 is a data storage subsystem consisting of programs and data that is stored on any suitable storage device such as one or more hard disk drives, memories, or any other electronic digital data recording device configured to store data. Although database 120 is depicted as a single device in FIG. 1, database 120 may span multiple devices located in one or more physical locations. For example, database 120 may include one or nodes located at one or more data warehouses. Additionally, in one embodiment, database 120 may be located on the same device or devices as server computer 105. Alternatively, database 120 may be located on a separate device or devices from server computer 105.

Database 120 may be in any format, such as a relational database, a noSQL database, or any other format. Database 120 is communicatively connected with server computer 105 through any kind of computer network using any combination of wired and wireless communication of the type previously described. Optionally, database 120 may be communicatively connected with other components, either directly or indirectly, such as one or more third party data suppliers. Generally, database 120 stores data related to electronic maps including, but not limited to: electronic map source data 125, electronic map data 130, telemetry data 135, and aggregated telemetry data 140. These datasets may be stored as columnar data in a relational database or as flat files.

In one embodiment, electronic map source data 125 is raw digital map data that is obtained, downloaded or received from a variety of sources. The raw digital map data may include satellite images, digital street data, building or place data or terrain data. Example sources include National Aeronautics and Space Administration (NASA), United States Geological Survey (USGS), and DigitalGlobe. Electronic map source data 125 may be updated at any suitable interval, and may be stored for any amount of time. Once obtained or received, electronic map source data 125 is used to generate electronic map data 130.

In one embodiment, electronic map data 130 is digital map data that is provided, either directly or indirectly, to client map applications, such as client map application 155, using an API. Electronic map data 130 is based on electronic map source data 125. Specifically, electronic map source data 125 is processed and organized as a plurality of vector tiles which may be subject to style data to impose different display styles. Electronic map data 130 may be updated at any suitable interval, and may include additional information beyond that derived from electronic map source data 125. For example, using aggregated telemetry data 140, discussed below, various additional information may be stored in the vector tiles, such as traffic patterns, turn restrictions, detours, common or popular routes, speed limits, new streets, and any other information related to electronic maps or the use of electronic maps.

In one embodiment, telemetry data 135 is digital data that is obtained or received from mobile computing devices via function calls that are included in a Software Development Kit (SDK) that application developers use to integrate and include electronic maps in applications. As indicated by the dotted lines, telemetry data 135 may be transiently stored, and is processed as discussed below before storage as aggregated telemetry data 140.

The telemetry data may include mobile device location information based on GPS signals. For example, telemetry data 135 may comprise one or more digitally stored events, in which each event comprises a plurality of event attribute values. Telemetry events may include: session start, map load, map pan, map zoom, map tilt or rotate, location report, speed and heading report, or a visit event including dwell time plus location. Telemetry event attributes may include latitude-longitude values for the then-current position of the mobile device, a session identifier, instance identifier, application identifier, device data, connectivity data, view data, and timestamp.

As used herein, telemetry data representing a trip of a device from an origin location to a destination location is termed a "trace." In particular, the trace may represent the device's movement along one or more roads represented in the electronic map data 130 (i.e. road data). A trace can comprise an ordered sequence of points, each point associated with a location and one or more adjacent points in the trace, and other suitable telemetry data. For example, a user's trip from home to work on one or more roads can be represented in telemetry data by a single trace. In this example, the first point of the associated trace is associated with the location of the user's home and the last point of the trace associated with the user's work. The path taken from the user's home to the user's work can be represented in a series of intermediate points between the first and last points of the trace and one or more links between adjacent points of the trace. As each trace represents a single trip, many traces for a single device may be collected in a single day and many more over a longer period. For example, over a period of a month, twenty traces may be collected for a user's trips from home to work. Because telemetry data often includes a time stamp, a trace will also in many cases be indicative of what time the user of the device left home and when the user arrived at work.

In one embodiment, aggregated telemetry data 140 is telemetry data 135 that has been processed using anonymization, segmenting, filtering, or a combination thereof. Anonymization may include removing any data that identifies a specific mobile device or person. Segmenting may include segmenting a continuous set of related telemetry data into different segments or segments representing portions of travel along a route (e.g. a road). For example, telemetry data may be collected during a drive from John's house to John's office. Segmenting may break that continuous set of telemetry data into multiple segments so that, rather than consisting of one continuous trace, John's trip may be from John's house to point A, a separate trip from point A to point B, and another separate trip from point B to John's office. Segmenting may also remove or obscure start points, end points, or otherwise break telemetry data into any size. Filtering may remove inconsistent or irregular data, delete traces or trips that lack sufficient data points, or exclude any type or portion of data for any reason. Once processed, aggregated telemetry data 140 is stored in association with one or more tiles related to electronic map data 130. Aggregated telemetry data 140 may be stored for any amount of time, such as a day, a week, or more. Aggregated telemetry data 140 may be further processed or used by various applications or functions as needed.

In one embodiment, mobile computing device 145 is any mobile computing device, such as a laptop computer, handheld computer, wearable computer, cellular or mobile phone, portable digital assistant (PDAs), or tablet computer. Although a single mobile computing device is depicted in FIG. 1, any number of mobile computing devices may be present. Each mobile computing device 145 is communicatively connected to server computer 105 through wireless network connection 165 which comprises any combination of a LAN, a WAN, one or more internetworks such as the public Internet, a cellular network, or a company network.

Mobile computing device 145 is communicatively coupled to GPS satellite 160 using GPS transceiver 150. GPS transceiver 150 is a transceiver used by mobile computing device 145 to receive signals from GPS satellite 160, which broadly represents three or more satellites from which the mobile computing device may receive signals for resolution into a latitude-longitude position via triangulation calculations.

Mobile computing device 145 also includes wireless network interface 160 which is used by the mobile computing device to communicate wirelessly with other devices. In particular, wireless network interface 160 is used to establish wireless network connection 165 to server computer 105. Wireless network interface 160 may use WiFi, WiMAX, Bluetooth, ZigBee, cellular standards, or others.

Mobile computing device 145 also includes other hardware elements, such as one or more input devices, memory, processors, and the like, which are not depicted in FIG. 1. Mobile computing device 145 also includes applications, software, and other executable instructions to facilitate various aspects of embodiments described herein. These applications, software, and other executable instructions may be installed by a user, owner, manufacturer, or other entity related to mobile computing device. In one embodiment, mobile computing device 145 includes client map application 155 which is software that displays, uses, supports, or otherwise provides electronic mapping functionality as part of the application or software. Client map application 155 may be any type of application, such as a taxi service, a video game, a chat client, a food delivery application, etc. In an embodiment, client map application 155 obtains electronic mapping functions through SDK 157, which may implement functional calls, callbacks, methods or other programmatic means for contacting the server computer to obtain digital map tiles, layer data, or other data that can form the basis of visually rendering a map as part of the application. In general, SDK 157 is a software development kit that allows developers to implement electronic mapping without having to design all of the components from scratch. For example, SDK 157 may be downloaded from the Internet by developers, and subsequently incorporated into an application which is later used by individual users.

In server computer 105, mapping application 110 provides the API 112 that may be accessed, for example, by client map application 155 using SDK 157 to provide electronic mapping to client map application 155. Specifically, mapping application 110 comprises program instructions that are programmed or configured to perform a variety of backend functions needed for electronic mapping including, but not limited to: sending electronic map data to mobile computing devices, receiving telemetry data 135 from mobile computing devices, processing telemetry data 135 to generate aggregated telemetry data 140, receiving electronic map source data 125 from data providers, processing electronic map source data 125 to generate electronic map data 130, and any other aspects of embodiments described herein.

Mapping application 110 includes correction mapping module 113, speed estimation module 114, and rectification module 115, which operate together to provide accurate speed estimates for road segments and routes. Correction mapping module 113 is configured to train a speed correction model based on trace data from one or more geographic regions to transform estimated road segment speeds to corrected road segment speeds. Speed estimation module 114 is configured to generate speed estimations for road segments based on live trace data, previously stored aggregated telemetry data 140, or some combination thereof. Rectification module 115 receives estimated speeds and, using the results of a trained speed correction model provided by correction mapping module 113, transforms the estimated speeds to corrected speeds.

II. Rectifying Live Speed Estimations

Figure 2:
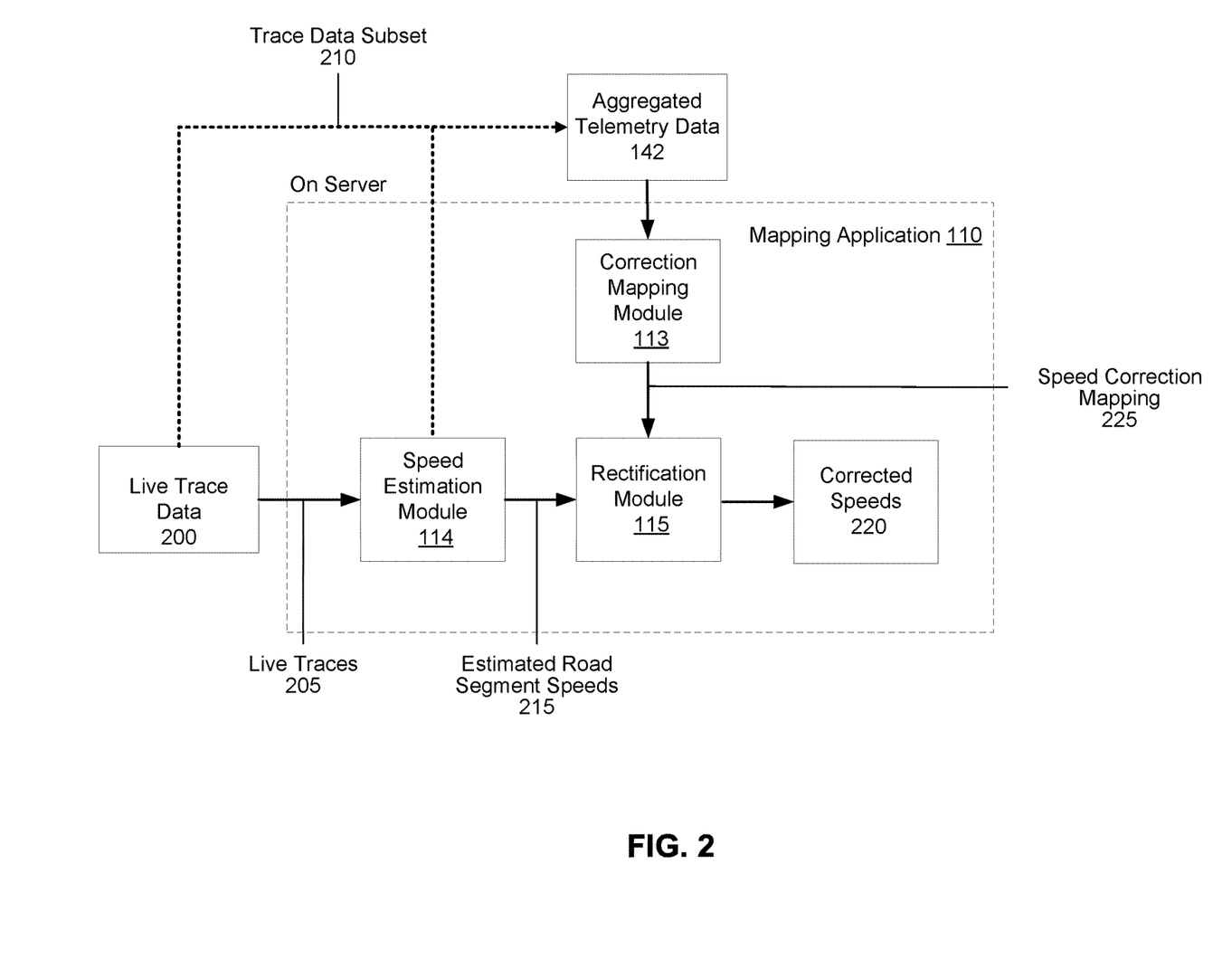
FIG. 2 is a flowchart illustrating an architecture of a mapping application for correcting estimated speeds, in accordance with an embodiment.
Figure 3:
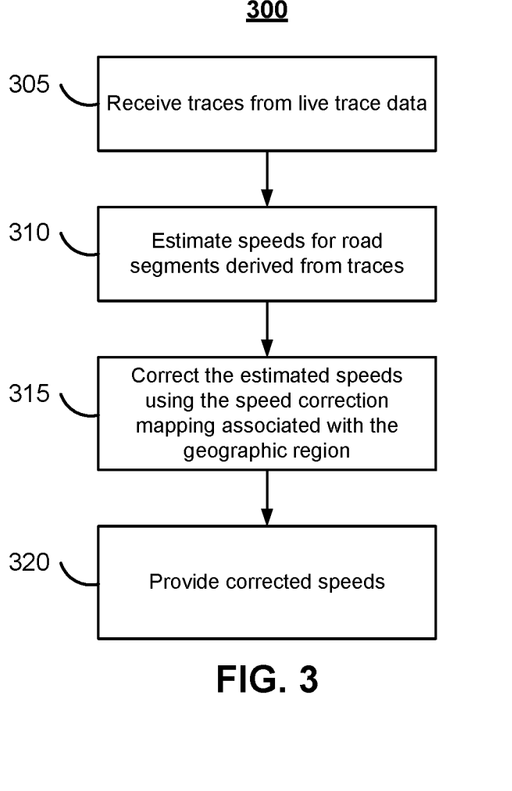
FIG. 3 is a flowchart for correcting estimated speeds derived from live trace data, in accordance with an embodiment.

FIG. 2 and FIG. 3 are a data flow diagram and a flowchart, respectively, that together illustrate the rectifying of estimated speeds derived from live trace data, in accordance with one or more embodiments. In particular, FIG. 2 is a data flow diagram depicting the estimation and correction of speed data by components of the mapping application 110, in accordance with an embodiment. Server computer 105 receives live trace data 200 collected by one or more mobile computing devices 145. As used herein, "live" refers to data received by the server which was collected by a mobile computing device within some recent time frame. For example, live trace data 200 may be trace data with a timestamp indicating a time within 15 minutes of the current time. A subset of the live trace data 200 is stored in the database 120 as aggregated telemetry data 140 for immediate or delayed processing (as indicated by the dotted line) by various components of server computer 105.

As illustrated in FIG. 2, mapping application 110 receives a set of live traces 205 from live trace data 200 corresponding to trace data for device movement in a geographic region, as described above. The live traces 205 are input by mapping application 110 into speed estimation module 114, which estimates speeds on a set of road segments derived from the live traces 205. In one embodiment, speed estimation module 114 filters the set of live traces 205 for a particular type of device movement (e.g. driving or non-driving) by classifying each planned trace as originating from a device in a certain travel mode (e.g. driving or non-driving), as taught in co-pending U.S. patent application Ser. No. 15/724,875, entitled "PU Classifier for Detection of Travel Mode Associated with Computing Devices".

Speed estimation module 114 segments the live traces 205 into a plurality of road segments and uses the road segments to determine an estimated device speed for each road segment. In one embodiment, speed estimation is achieved by aggregating observed actual speeds for each road segment in a histogram, as taught in co-pending U.S. patent application Ser. No. 15/963,193, entitled "Generating Accurate Speed Estimations Using Aggregated Telemetry Data", filed on Aug. 31, 2017. Speed estimation module 114 also uses the estimated speeds to update trace data subset 210 stored in aggregated telemetry data 140 with estimated speed information, as indicated by the dotted lines in FIG. 2. For example, speed estimation module 114 may add time stamps to trace points in a road segment that reflect an estimated time of arrival at a point based on an estimated speed for the road segment.

Speed estimation module 114 inputs the estimated road segment speeds 215 into rectification module 115 in order to correct any estimation biases in the speed estimation module 114. Estimation biases in the correction mapping module 114 are the result of determining speed estimations based on collected road data dominated by certain characteristics not shared by all roads. For example, the estimations may be done using a model which is trained primarily using road data from urban centers with dense traffic. To correct for these biases, rectification module 115 identifies, for each estimated road segment with a speed estimation, a road segment-specific speed correction mapping 225. The identified speed correction mapping 225 is a mapping derived from feature vectors describing a group of geographic regions that includes the geographic region of the road segment. Rectification module 115 corrects each estimated road segment speed using the corresponding speed correction mapping 225 and outputs the corrected speeds 220 for processing by other components of mapping application 110. In one embodiment, correcting an estimated speed with speed correction mapping 225 is achieved by looking up a speed correction coefficient associated with the estimated speed stored in the mapping and computing the product of the estimated speed and speed correction coefficient. For example, speed correction mapping 225 may associate a speed correction coefficient of 1.02 with an estimated speed of 100 km/hour, giving a corrected speed of 102 km/hour. In the same or different embodiment, correction mapping module 113 generates speed correction mappings using the method described in section 3. In other embodiments, correction mapping module 113 provides speed correction models trained on aggregated telemetry data 142 which receive estimated speeds as input and output corrected speeds.

The corrected speeds output by rectification module 115 may be used by other components of mapping application 110. For example, the corrected speed may be used to provide an estimated time of arrival to a user of mobile computing device 145. For example, a user of mobile computing device 145 may input a start location and end location on client map application 155, the user intending to travel from the start location to the end location. In this case, mapping application 155 may communicate with mapping application 110 via the API 112 to request a route from the start location to the end location and an estimated time of arrival. The mapping application 155 may determine a set of road segments comprising a route between the start location and end location, estimate a speed for each of the road segments using speed estimation module 114, correct the road segments using rectification module 115, and aggregate the corrected speeds to determine an estimated time of arrival at the end of the route. Mapping application 110 may finally provide the estimated time of arrival to the user on mobile computing device 145 at the end of the suggested route.

FIG. 3 is a flowchart 300 depicting the sequence of actions performed by mapping application 110 to estimate and correct speeds derived live trace data, in accordance with an embodiment. Mapping application 110 receives 300 a set of traces corresponding to live trace data for device movement in a geographic region, as described above. Using the live traces, mapping application 110 estimates 310 speeds on a set of road segments derived from the live traces. Mapping application 110 then corrects 315 each estimated road segment speed using a speed correction mapping associated with a geographic region including the road segment. Finally, mapping application 110 provides 320 the corrected speeds for processing by other components of mapping application 110, server computer 105, or any other device communicatively coupled to server computer 105.

III. Generating Speed Correction Mapping

Figure 4:
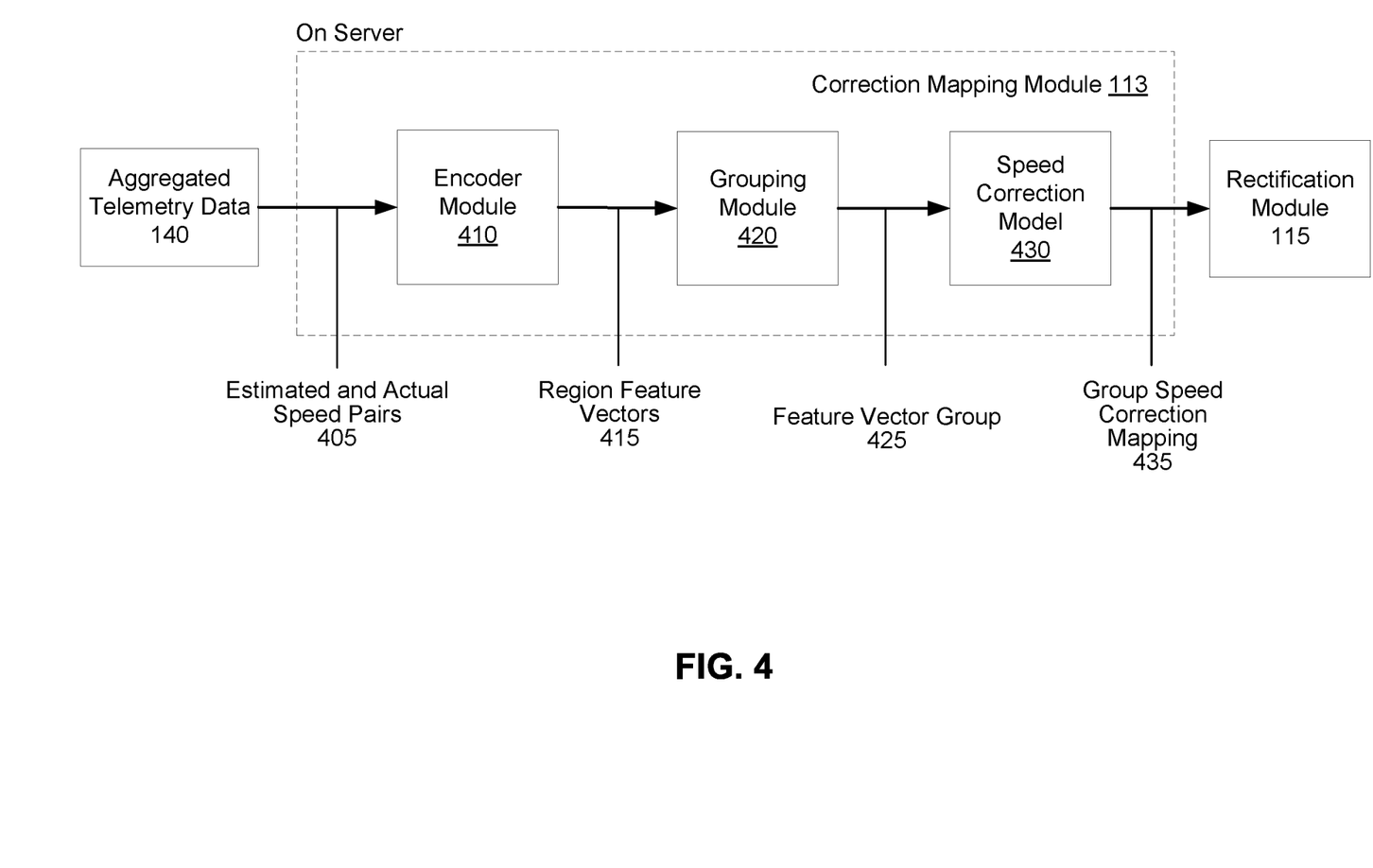
FIG. 4 is a flowchart illustrating an architecture of a correction mapping module for generating speed correction mappings, in accordance with an embodiment.
Figure 5:
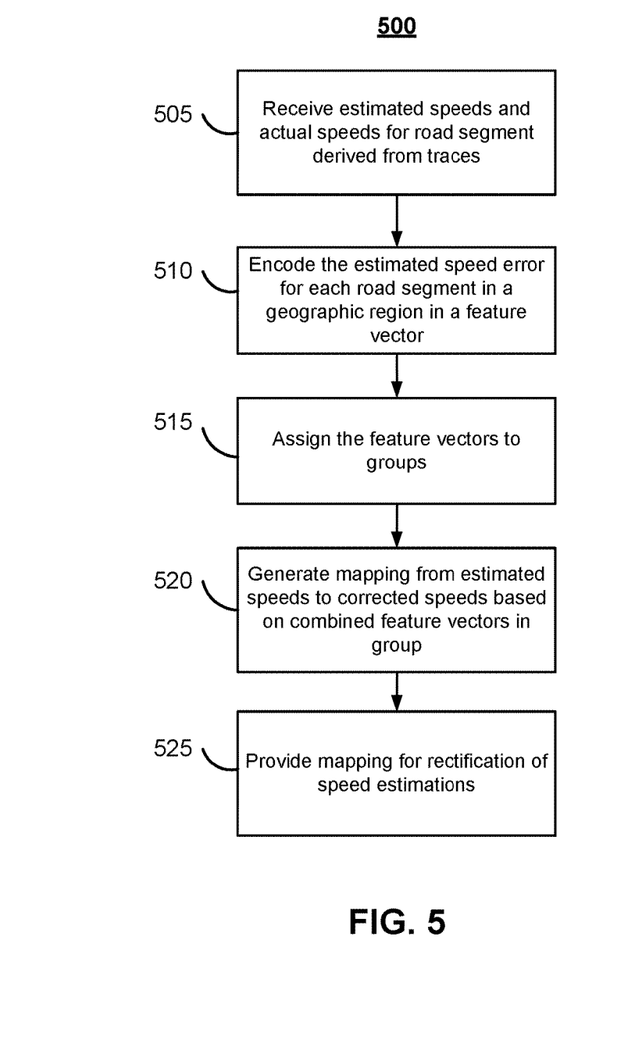
FIG. 5 is a flowchart for generating speed correction mappings, in accordance with an embodiment.

FIG. 4 and FIG. 5 are a data flow diagram and a flowchart, respectively, that together illustrate generating speed correction mappings, in accordance with an embodiment. In particular, FIG. 4 is a data flow diagram depicting the generation of speed correction mappings by correction mapping module 113, in accordance with an embodiment. Correction mapping module 113 is configured to generate speed correction mappings for one or more geographic regions based on estimated and actual speeds for individual road segments. As described in section I, road segments are obtained by segmenting a consecutive set of related telemetry data that represent portions of travel along a route. Actual road segment speeds are determined based on real world movement of a client device corresponding to received trace data. In one embodiment, aggregated telemetry data 140 includes time stamps indicating when the client device capturing the telemetry data arrived at each point in a trace. In this case, actual speeds are calculated for each road segment as distance traveled between the start point and end point of a road segment divided by the time elapsed. Estimated speeds are calculated for road segments based on previously determined actual speeds on the same road segment stored in aggregated telemetry data 140. In one embodiment, speed estimation is performed using the histogram technique discussed in section II. In the same or different embodiment, estimated arrival time stamps are stored for each point in a trace, and estimated speeds are determined by correction mapping module 113 using a similar technique as described for actual speeds.

Correction mapping module 113 receives telemetry data stored in aggregated telemetry data 140, including estimated and actual speed pairs 405 for road segments derived by segmenting the telemetry data. In one embodiment, the received telemetry data has been classified as originating from a device in a certain travel mode (e.g. driving or non-driving), as described in section II, so that speeds can correctly be calculated for different travel modes. In the same or different embodiment, the aggregated telemetry data 140 has been anonymized, segmented, filtered, or any combination thereof, as described above in relation to the aggregated telemetry data 140. If the aggregated telemetry data 140 has been anonymized, then the origin of the estimated and actual speed pairs 405 (e.g. the mobile computing device 145) is not included with the telemetry data 140. Additionally, if the aggregated telemetry data 140 has been segmented, then each road segment is not associated with a path traveled by a particular mobile client device. An estimated and actual speed pair consists of an estimated speed for a road segment computed based on information determined prior to movement of a client device along the road segment, and an actual speed based on information observed as the client device moved along the road segment. Each road segment is included in one of a plurality of geographic regions, indicated by the coordinate values of the telemetry data used to derive the road segment. The plurality of geographic regions corresponds to adjacent regions on the surface of the Earth. In one embodiment, the geographic regions are arranged in a grid, where each geographic region is a rectangular section of the grid.

The estimated and actual speed pairs 405 are provided to encoder module 410, which encodes the error between the estimated and actual speeds for road segments from a particular geographic region in a feature vector 425. In some embodiments, the feature vector encodes additional information derived from the telemetry data 140, such as the time of day the speeds were collected, the day in the week the speeds were collected, the type of road segment (e.g. highway or dirt road), traffic congestion, etc. For example, encoder module 410 may determine and encode an estimation optimism bias which indicates how optimistic or pessimistic estimates typically are for the geographic region corresponding to a road segment. As another example, encoder module 410 may encode a congestion coefficient which indicates the traffic density on the road segment at the time the telemetry data was collected. These values may also be derived by other components of mapping application 110 or component of system 100.

In some embodiments, the error encoder module determines the frequency of each estimated and actual speed pair and encodes the frequency of each possible pair in a two-dimensional feature vector. For example, the feature vector may be a matrix where the value at an (x, y) position indicates the frequency of an estimated speed x corresponding to an actual speed y. In various embodiments, encoder module 410 performs additional processing on the encoded feature vector. For example, encoder module 410 may normalize the feature vector. In another example, the encoder module may perform dimensionality reduction on the feature vector, such as by performing convolutions of one or more dimensions.

Grouping module 420 receives the feature vectors for each region 415 from error encoder module 410. Each feature vector is assigned to a group of feature vectors by grouping module 420, where each group includes feature vectors corresponds to one or more geographic regions. Thus, the speed correction models 430 derived from the feature vectors can be region-specific, thereby accounting for differences in speed characteristics in different geographic regions. In one embodiment, grouping module 420 groups feature vectors that correspond to adjacent geographic regions. In another embodiment, grouping module 420 assigns feature vectors to a group based on the similarity between the features encoded in the feature vectors in the group. For example, two feature vectors may both encode an average relative error of 5% between an estimated speed of 50 km/hour and observed actual speeds. In some embodiments, the feature vectors are assigned to groups using a clustering algorithm, such as K-Means. Grouping module 420 may compare a feature vector to other features in a group by determining a similarity score between a given feature vector and one or more other feature vectors (e.g. based on the encoded errors) and compare the score to a similarity threshold to determine whether the feature vectors are sufficiently similar for inclusion in the same group. For example, grouping module 420 may determine the cosine similarity between a given feature vector and another feature vector in a candidate feature vector group. In some embodiments, grouping module 420 may group feature vectors based on additional features encoded in the feature vectors, such as the information derived from the telemetry data 140 described above.

In the same or different embodiments, in order to obtain a sufficient amount of data for training a speed correction model 430 to produce accurate results, grouping module 420 continues grouping feature vectors until the number of traces collectively used to derive the group of feature vectors exceeds a threshold. In this way, the speed correction model 430 can be trained to correct estimated speeds for roads in geographic regions with relatively little telemetry data if that geographic region is determined to be similar or adjacent to geographic regions with sufficient telemetry data. As such, the accuracy of speed corrections can be improved for regions without significant telemetry data using the methods disclosed herein.

One or more feature vectors from the feature vector group are input into speed correction model 430, which generates a mapping 435 from a range of estimated speeds to corrected speeds. In one embodiment, the feature vectors from the feature vector group are processed and aggregated into a single feature vector which is input into speed correction model 430. As used herein, a mapping is a representation of a function that takes as input a value x and outputs a value y. In some embodiments, the mapping 435 generated by speed correction model 430 is a set of coefficients learned by speed correction model 430 by training on the one or more input feature vectors. In this case, speed correction model 430 coefficients are applied to input estimated speeds to obtain corrected speeds. For example, speed correction model 430 may provide a coefficient for each integer value between 1 and 120, where each integer represents a value in km/hour. If the coefficient for 50 is 1.02, then the mapping 435 multiplies 50 by 1.02 and outputs 51, correcting an estimated speed of 50 km/hour to 51 km/hour.

The domain (i.e. range of possible inputs) and co-domain (i.e. range of possible outputs) of the speed correction mapping varies by embodiment. In one embodiment, the domain of each speed correction mapping is equivalent. For example, the domain of each mapping may be the set of integers between 1 and 120, where each integer represents a value in km/hour. In the same or different embodiment, the co-domain of each mapping is the same as the domain. For example, if the domain was as described in the previous example, the co-domain could also be the set of integers between 1 and 120. In some embodiments, speed correction mapping 435 may have already been learned by speed correction model 430, and the new feature vector group may be used to update speed correction mapping 435. In this case, speed correction model 430 and speed correction mappings 435 it generates are updated over time as new data becomes available. In other embodiments, speed correction mapping 435 may be learned by speed correction model 430 based entirely on feature vector group 425.

Correction mapping module 113 provides each speed correction mapping 435 to the rectification module 115 to be used for rectifying estimated speeds for road segments. In one embodiment, speed correction mapping 435 is a set of coefficients learned by an instance of speed correction model 430 by training on a feature vector group. In another embodiment, speed correction mapping 435 is the trained instance of speed correction model 430. In this case, correction mapping module 113 outputs a trained instance of speed correction model 430 for each group of feature vectors corresponding to geographic regions.

In some embodiments, speed correction model 430 uses statistical inference to determine a speed correction mapping 435 that minimizes the error between actual road segment speeds and corrected speeds (e.g. speeds output by the mapping given an estimated speed input). In various embodiments, speed correction model 430 uses an optimization algorithm to generate a speed correction mapping, such as a Limited-memory Broyden-Fletcher-Goldfarb-Shanno (BFGS) algorithm. In other embodiments, speed correction model 430 uses a Markov chain Monte Carlo (MCMC) algorithm to generate a speed correction mapping, such as a No-U-Turn sampler. For example, the feature vector input into speed correction model 430 may encode a two-dimensional distribution wherein one dimension represents estimated speed and the other dimension represents actual speed. In this case, correction mapping module 113 uses an MCMC algorithm to determine a line that approximates the distribution. As a result, for each possible value in the speed estimation dimension the line indicates a corresponding actual speed, which can be inferred as a reasonable corrected speed. This example is discussed in more detail below in section IV.

The aggregated telemetry data 140 used to derive speed correction mapping 435 may be anonymized, segmented, or filtered, as discussed above in relation to estimated and actual speed pairs 405. As the method performed by correction mapping module 113 to generate speed correction mapping 435 relies only on aggregated telemetry data 140 that includes estimated and actual speed pairs on particular road segments, the origin of the data is not required by the correction mapping module 113. In particular, the aggregated telemetry data 140 may not include an identifier of the mobile computing device 145 that collected the data, the path or trip which the data was derived from, or any other information which might identify a particular device or person. As such, the correction mapping module 113 is operable to accurately correct speed estimates on road segments while maintaining the privacy of the mobile device users who provide the aggregated telemetry data 140. Additionally, the speed correction model 430 does not require this information for training.

FIG. 5 is a flowchart 500 depicting the sequence of actions performed by correction mapping module 113 to generate speed correction mappings using aggregated telemetry data, in accordance with an embodiment. Correction mapping module 113 receives 505 telemetry data stored in aggregated telemetry data 140. Correction mapping module 113 encodes 510 the error between the estimated and actual speeds for road segments from a particular geographic region in a feature vector. Each feature vector is assigned 515 to a group of feature vectors by correction mapping module 113, where each group includes feature vectors corresponding to one or more geographic regions. Using one or feature vectors from the feature vector group, correction mapping module 113 generates 520 a mapping from a range of estimated speeds to corrected speeds. Correction mapping module 113 then provides 525 each speed correction mapping to the rectification module 115 to be used for rectifying estimated speeds for road segments.

IV. Feature Vector Encoding and Grouping

Figure 6A:
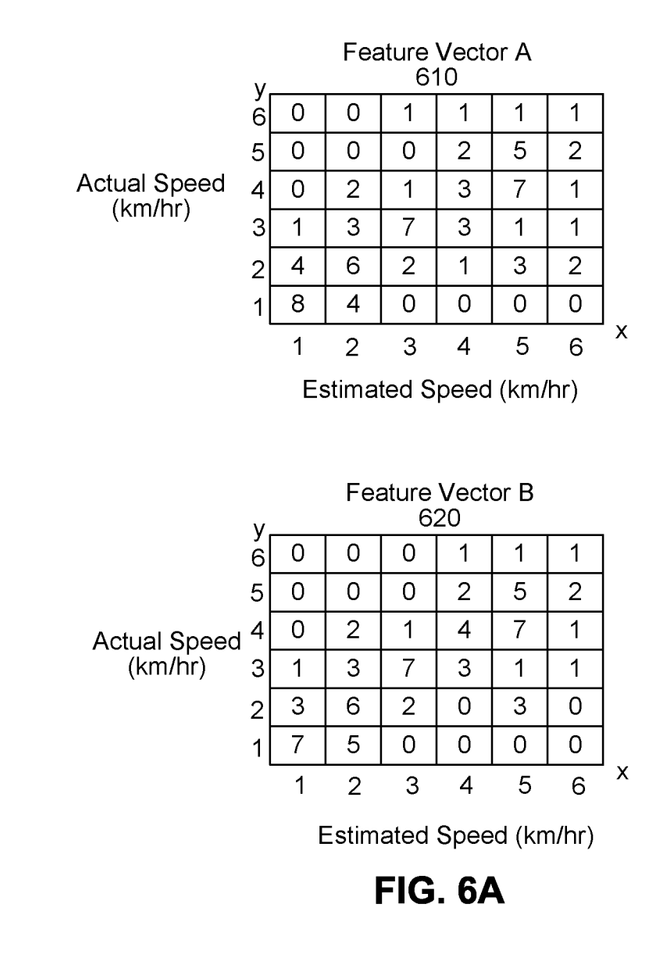
FIG. 6A illustrates example feature vectors encoding estimation errors for road segments in respective geographic regions.

FIG. 6A illustrates example feature vector A 610 and feature vector B 620 encoding estimation errors of road segments from two respective geographic regions, according to an embodiment. Feature vectors A 610 and B 620 may be derived from aggregated telemetry data 140 corresponding to two geographic regions by encoding module 410. As depicted in FIG. 6A, feature vectors A 610 and B 620 are two-dimensional matrices wherein the x-dimension corresponds to estimated speeds in kilometers per hour (km/hr) (as estimated by the speed estimation module 114) and the y-dimension corresponds to actual speeds in km/hr (as measured on the mobile computing devices 145). For simplicity, the x and y dimensions of feature vectors A and B are both only 6 (e.g., 1-6 km/hr if 1 km/hr per dimension). However, the feature vectors used to encode estimation errors may use any number of dimensions along both axes to represent a discrete range of estimated and actual speeds. For example, the feature vectors may be 120×120 matrices and encode estimation errors for estimated speeds ranging from 1-120 km/hr. In other embodiments, the speed change between dimensions may be other than 1 km/hr (e.g., each dimension may cover a 5 km/hr range or speeds, or a range over different units, such as miles/hr rather than km/hr). In additional embodiments, the feature vectors A 610 and B 620 encode additional information, such as traffic congestion (e.g. encode density of road per square meter) or the type of roads in the geographic region (e.g. percentage of urban roads vs percentage of rural roads). These embodiments are discussed in greater detail below in section V.B.

In the example of FIG. 6A, feature vector A 610 and B 620 encode all estimated and actual pairs (including all estimation errors) in their respective geographic regions for speeds ranging from 1-6 km/hr. The value at a position (x,y) in feature vector A 610 and feature vector B 620 indicate the frequency (i.e. count) of a given estimated and actual speed pair. For example, feature vector A 610 encodes a frequency of 3 for the estimated and actual speed pair (4 km/hr, 3 km/hr). As such, a speed of 4 km/hr was estimated 3 times for road segments in a geographic region corresponding to feature vector A 610 when the actual speed was 3 km/hr.

Figure 6B:
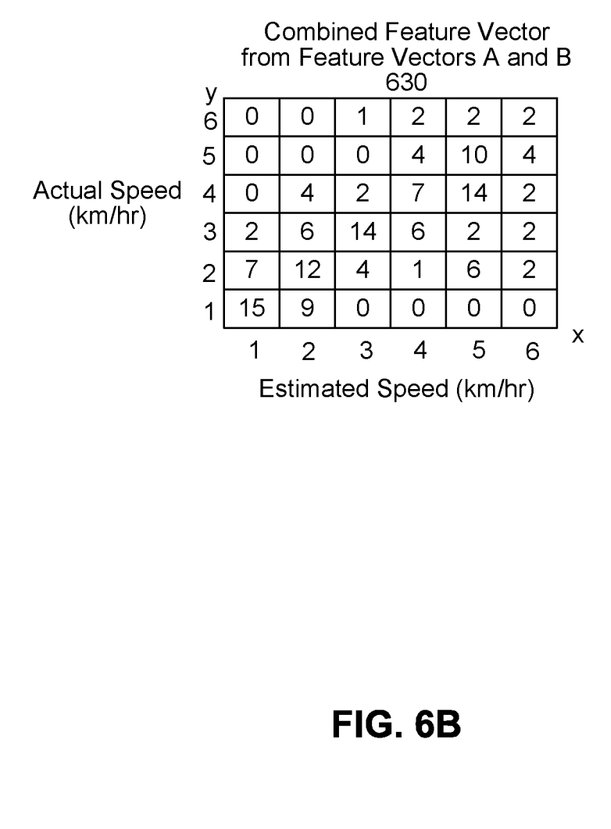
FIG. 6B illustrates an example combined feature vector derived from the feature vectors in FIG. 6A.

FIG. 6B illustrates a combined feature vector 630 corresponding to a feature vector group consisting of feature vector A and feature vector B. After determining feature vector A 610 and B 620, correction mapping module 113 assigns the two feature vectors to the same feature vector group. Feature vector A 610 and B 620 are aggregated into a single feature vector 630 by computing the sum of feature vector A 610 and B 620. In other embodiments, the feature vector A 610 and B 620 are processed together or separately using one or more additional matrix operations, such as a matrix product, difference, or any other result of an operation on feature vector A and feature vector B. For example, correction mapping module 113 may perform convolutions on feature vector A and feature vector B to reduce the dimensions of the feature vectors. As another example, correction mapping module 113 may determine an average value between corresponding elements of feature vector A and feature vector B. Additionally, feature vector A and B may be normalized or otherwise preprocessed prior to being aggregated into a single feature vector 630. For the purposes of illustration, the feature vector group includes only two feature vectors (e.g. feature vectors A and B). However, a feature vector group may include any number of feature vectors depending on the requirements of a particular embodiment.

V. Correction Mapping Module Variations

In addition to considering estimation errors and applying a single correction model, correction mapping module 113 may consider other telemetry data features and model variations.

V.A. Dynamically Updating Speed Corrections

Longer term traffic patterns on road segments may change over time based on various factors. Example factors include the time of year, changes in weather, changes in road quality, changes in routes, etc. In various embodiments, correction mapping module 113 attempts to account for these factors by periodically updating its various components based on recently received aggregated telemetry data 140. In some embodiments, the set of aggregated telemetry data considered by components of correction mapping module 113 is constrained to a sliding time window, such as the prior 2 weeks, the prior day, etc. In these cases, the process described in relation to FIGS. 2 and 3 is performed periodically by mapping application 110 to account for an updated set of aggregated telemetry data 140. In some embodiments, the same time frame is used for each component of mapping application 110. In other embodiments, the data used by different components of mapping application 110 are constrained to different time frames. For example, the time frames used by subsequent components of mapping application 110 may have narrower time frames than preceding components. In this case, grouping module 220 may determine groups of feature vectors corresponding to geographic regions based on a set of aggregated telemetry data constrained to a first time frame (e.g. the preceding one month, two months, or three months). Then, speed correction model 430 may generate a speed correction mapping for a group of feature vectors by processing the feature vectors to encode error estimates from aggregated telemetry data within a second time frame (e.g. the preceding one week, two weeks, three weeks). When data processed by one or more components is constrained to a time frame as described above, correction mapping module 113 may periodically execute the steps described above for a particular component based on the time frame. For example, the feature vector groups may be determined by grouping module 420 once per day or the speed correction mappings may be generated by correction mapping module 113 once a day. In some embodiments, correction mapping module 113 may generate new speed correction mappings at different time intervals for different groups of feature vectors corresponding to geographic regions. For example, correction mapping module 113 may frequently generate updated speed correction mappings for groups corresponding to geographic regions with significant received telemetry data, and may infrequently generate updated speed correction mappings for groups corresponding to geographic regions with minimal received telemetry data.

V.B. Differentiating Corrections Based on Estimated Speed Context

Shorter term traffic patterns on road segments may also change over time based on various factors. Example factors include the time of day, day of the week, type of road, traffic congestion, etc. In various embodiments, correction mapping module 113 attempts to account for these factors by differentiating how estimation errors are encoded and grouped based on telemetry data context.

In one embodiment, encoder module 210 groups the errors for estimated and actual speed pairs based on one of the factors described above (e.g. time of day, day of the week, etc.) before encoding the errors in a feature vector. In the same or different embodiment, these factors are encoded in the feature vector by the encoder module 210. In this case, the feature vector groups created by the grouping module 220 may be grouped based on these factors in addition to estimation error similarity. In this case, a geographic region may have more than one corresponding feature vector derived from road segment data in the geographic region. For example, a geographic region may have a corresponding week-day feature vector and a week-end feature vector. In this example, the grouping module 420 produces different groups for week-day and week-end feature vectors, and as a result speed correction model 430 generates week-day and week-end speed correction mappings. Accordingly, a speed estimate for a road segment in a particular geographic region would be corrected by rectification module 115 using a different speed correction mapping 225 depending on whether the speed was estimated for a week day or on the week-end. Similar examples follow for feature vectors differentiated by one or more other factors (e.g. time of day, day of the week, holiday, type of road, traffic congestion, etc.). In short, speed correction mappings 435 can be generated not only for different geographic regions, but also for any different combinations of variables, such as geographic region, time of day, day of week, month of year, holiday, type of road, traffic pattern, etc.

Mapping application 110 may also use multiple speed correction mappings to correct an estimated road segment speed 215. In one embodiment, speed correction mappings are applied sequentially. For example, a first correction mapping is used to transform an estimated speed to a first corrected speed, and then a second correction mapping is used to transform the first corrected speed to a final corrected speed. In this case, the first correction mapping may apply a significant correction, and the second mapping may apply a smaller, fine-tuning correction. Any number of correction mappings can be used to sequentially transform an estimated speed to a final corrected speed. In other embodiments, correction mappings may be combined into single mappings in order to achieve a mapping optimized to produce the most accurate results.

VI. System Diagnostics

The correction mapping module 113 may periodically execute system diagnostics in order to determine errors present in one or more components of mapping application 110. System diagnostics may be initiated by a system administrator or may be executed by mapping application 110 automatically. In some embodiments, the mapping application 110 outputs representations of data processed at each step of the speed correction process (e.g. process 500) when executing system diagnostics. For example, the correction mapping module 113 may output visual representations of the region feature vectors 415, the feature vector group 425, or the group speed correction mapping 435 (e.g. two dimensional or three-dimensional images). As another example, the correction mapping module 113 may output textual representations of the data (e.g. a diagnostics text file). The mapping application 110 may output data representations that correspond to the speed correction mappings for each geographic region or feature vector group 425, or may only output data representations that correspond to a subset of the speed correction mappings. The data representations output by the correction mapping module 113 may be processed by other components of the correction mapping module 113 in order to diagnose system errors, or may be reviewed by a system administrator.

The system diagnostics data representations output by the correction mapping module 113 may be used to detect anomalies in the speed correction process. For example, a speed correction mapping for a given feature vector group may correct estimated speeds of 25 km/hr by significantly more (e.g. adding 30 km/hr) than the average speed correction for the same mapping (e.g. adding 2 km/hr). This anomaly may be automatically detected by the correction mapping module 113, or may be determined by a system administrator through an analysis of the data representations. Furthermore, the anomaly may be tracked over time (e.g. the correction of 25 km/hr is higher than average for five consecutive updates of the speed correction mapping). In response to detecting this anomaly, correction mapping module 113 or a system administrator may analyze the data used to derive the speed correction mapping in order to diagnose whether there is a system error. If there a system error is detected, the correction mapping module 113 may automatically update the relevant components of mapping application 110 to address the error.

VII. Additional Considerations

Figure 7:
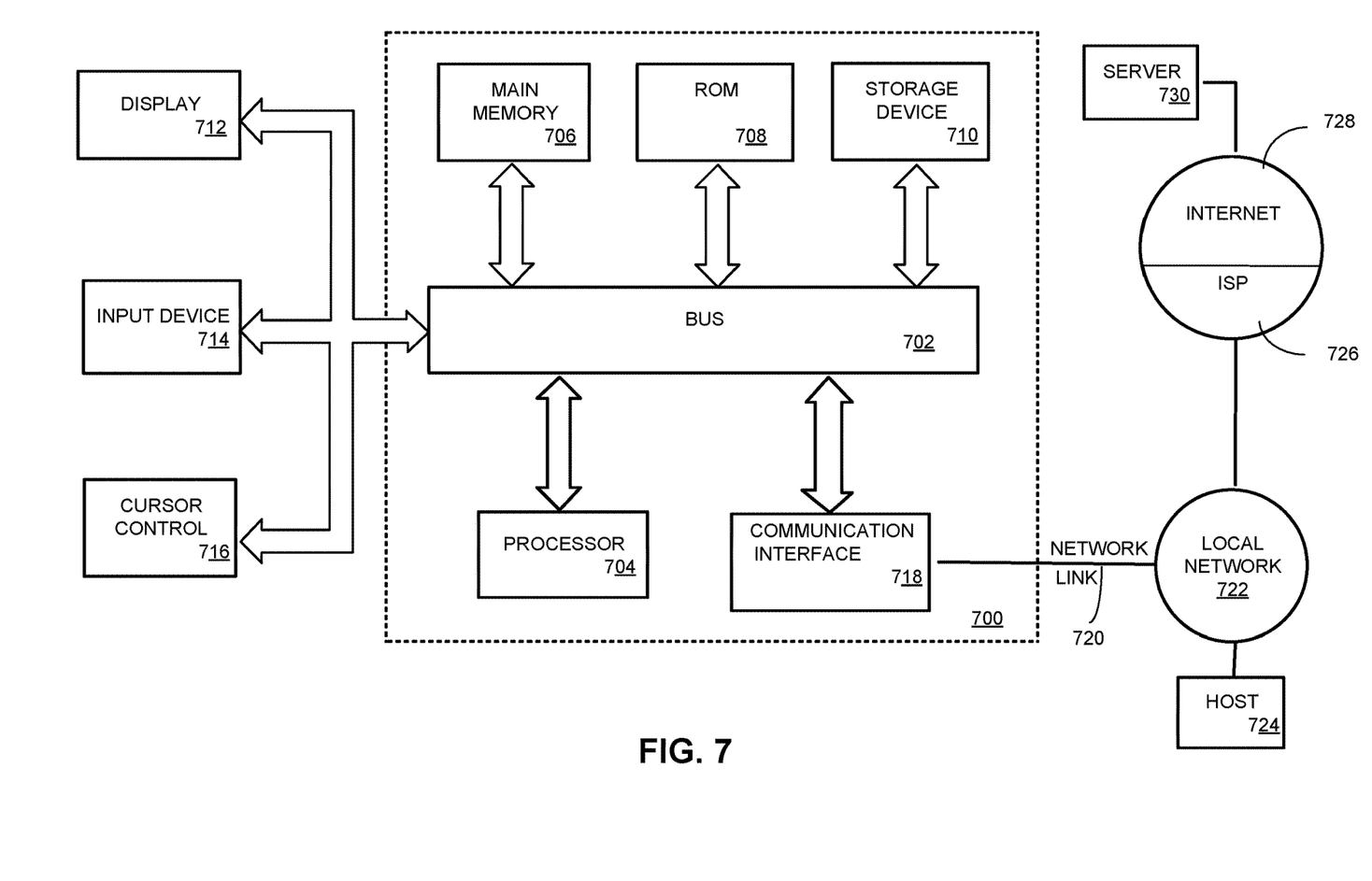
FIG. 7 illustrates a computer system upon which an embodiment may be implemented, according to one embodiment.

FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general-purpose microprocessor.

Example computer system 700 also includes a main memory 706, such as a random-access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a LCD screen, LED screen, or touch screen, for displaying information to a computer user. An input device 714, which may include alphanumeric and other keys, buttons, a mouse, a touchscreen, or other input elements is coupled to bus 702 for communicating information and command selections to processor 704. In some embodiments, the computer system 700 may also include a cursor control 716, such as a mouse, a trackball, or cursor direction keys for communicating direction information and command selections to processor 704 and for controlling cursor movement on display 712. The cursor control 716 typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and instructions that cause a machine to operation in a specific fashion. Such storage media may comprise non-volatile media and volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic, radio, or light waves, such as those generated during radio-wave and infra-red data communications, such as WI-FI, 3G, 4G, BLUETOOTH, or wireless communications following any other wireless networking standard.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and stored in storage device 710, or other non-volatile storage for later execution.

What is claimed is:

1. A computer-implemented method for correcting travel speed estimates on a computing device, the method comprising:
    estimating, for an electronic map comprising road data specifying a plurality of roads in a plurality of geographic regions, a speed associated with a segment of a road of the plurality of roads;
    identifying a speed correction mapping configured to transform estimated speeds to corrected speeds, the speed correction mapping determined from a subset of the road data, wherein the speed correction mapping is provided by a machine learned speed correction model trained to take estimated speeds as input and output corrected speeds;
    transforming the estimated speed to a corrected speed based on the speed correction mapping; and
    sending for display the corrected speed as part of an electronic map application.

2. The method of claim 1, wherein the subset of the road data specifies a set of roads from the plurality of roads in one or more geographic regions, the one or more geographic regions including the geographic region of the segment of the road associated with the speed.

3. The method of claim 1, wherein training the speed correction model comprises:
    for each of a plurality of road segments in the one or more geographic regions:
        determining one or more estimated speed and actual speed pairs on the road segment based on the road data;
        determining an error for each of the one or more estimated speed and actual speed pairs;
    encoding the errors of each of the plurality of road segments in one or more feature vectors; and
    inputting the one or more feature vectors into the speed correction model, the speed correction model configured to transform a plurality of estimated speeds to a plurality of corrected speeds for the one or more geographic regions.

4. The method of claim 3, wherein encoding the errors in the one or more feature vector comprises reducing one or more dimensions of the vector.

5. The method of claim 3, wherein inputting the one or more feature vectors into the speed correction model comprises:
    assigning the one or more feature vectors to a group of feature vectors based on a similarity of the errors of each of the plurality of road segments;
    processing the feature vectors in the group into a combined feature vector; and
    inputting the combined feature vector into the speed correction model.

6. The method of claim 5, wherein processing the feature vectors in the group into the combined feature vector comprises:
    determining a set of feature vectors from the group of features vectors derived from road data generated within a time range;
    deriving the combined feature vector from the set of feature vectors.

7. The method of claim 5, wherein the group of feature vectors correspond to geographic regions which are adjacent to each other on the electronic map.

8. The method of claim 3, wherein each feature vector is a matrix with a first dimension corresponding to a range of estimated speeds and a second dimension corresponding to a range of actual speeds, each value in the matrix representing the frequency of a distinct estimated speed and actual speed pair.

9. The method of claim 1, further comprising:
    converting the corrected speed to a second corrected speed using a second speed correction mapping, the second model trained on a second set of the road data.

10. The method of claim 1, wherein the speed correction mapping transforms a first range of estimated speeds to a second range of corrected speeds.

11. The method of claim 1, wherein the road data is filtered to include only road data classified as having a given type of device movement.

12. The method of claim 1, wherein determining the speed correction mapping comprises:
    filtering the road data based on one or more of a set of attributes of the road data, the attributes selected from the group consisting of a geographic position, an estimation optimism bias, a time of day, a day of the week, a road segment type, and a traffic congestion coefficient.

13. The method of claim 1, further comprising:
    filtering the subset of road data to include road data generated within a time range.

14. The method of claim 1, wherein the road data has been processed using one or more of the techniques selected from the group consisting of anonymizing, segmenting, or filtering.

15. A non-transitory computer-readable storage medium of a computing device storing executable computer instructions, the instructions configured to, when executed by a hardware processor on the mobile computing device, perform steps comprising:

estimating, for an electronic map comprising road data specifying a plurality of roads in a plurality of geographic regions, a speed associated with a segment of a road of the plurality of roads;

identifying a speed correction mapping configured to transform estimated speeds to corrected speeds, the speed correction mapping determined from a subset of the road data, wherein the speed correction mapping is provided by a machine learned speed correction model trained to take estimated speeds as input and output corrected speeds;

transforming the estimated speed to a corrected speed based on the speed correction mapping; and     sending for display the corrected speed as part of an electronic map application.

16. The computer readable storage medium of claim 15, wherein the subset of the road data specifies a set of roads from the plurality of roads in one or more geographic regions, the one or more geographic regions including the geographic region of the segment of the road associated with the speed.

17. A computing device computer system, the computing device comprising a hardware processor, the hardware processor configured to perform steps comprising:

estimating, for an electronic map comprising road data specifying a plurality of roads in a plurality of geographic regions, a speed associated with a segment of a road of the plurality of roads;

identifying a speed correction mapping configured to transform estimated speeds to corrected speeds, the speed correction mapping determined from a subset of the road data, wherein the speed correction mapping is provided by a machine learned speed correction model trained to take estimated speeds as input and output corrected speeds;

transforming the estimated speed to a corrected speed based on the speed correction mapping; and     sending for display the corrected speed as part of an electronic map application.

18. The computing device of claim 17, wherein the subset of the road data specifies a set of roads from the plurality of roads in one or more geographic regions, the one or more geographic regions including the geographic region of the segment of the road associated with the speed.

* * * * *